United States Patent Office 3,705,829
Patented Dec. 12, 1972

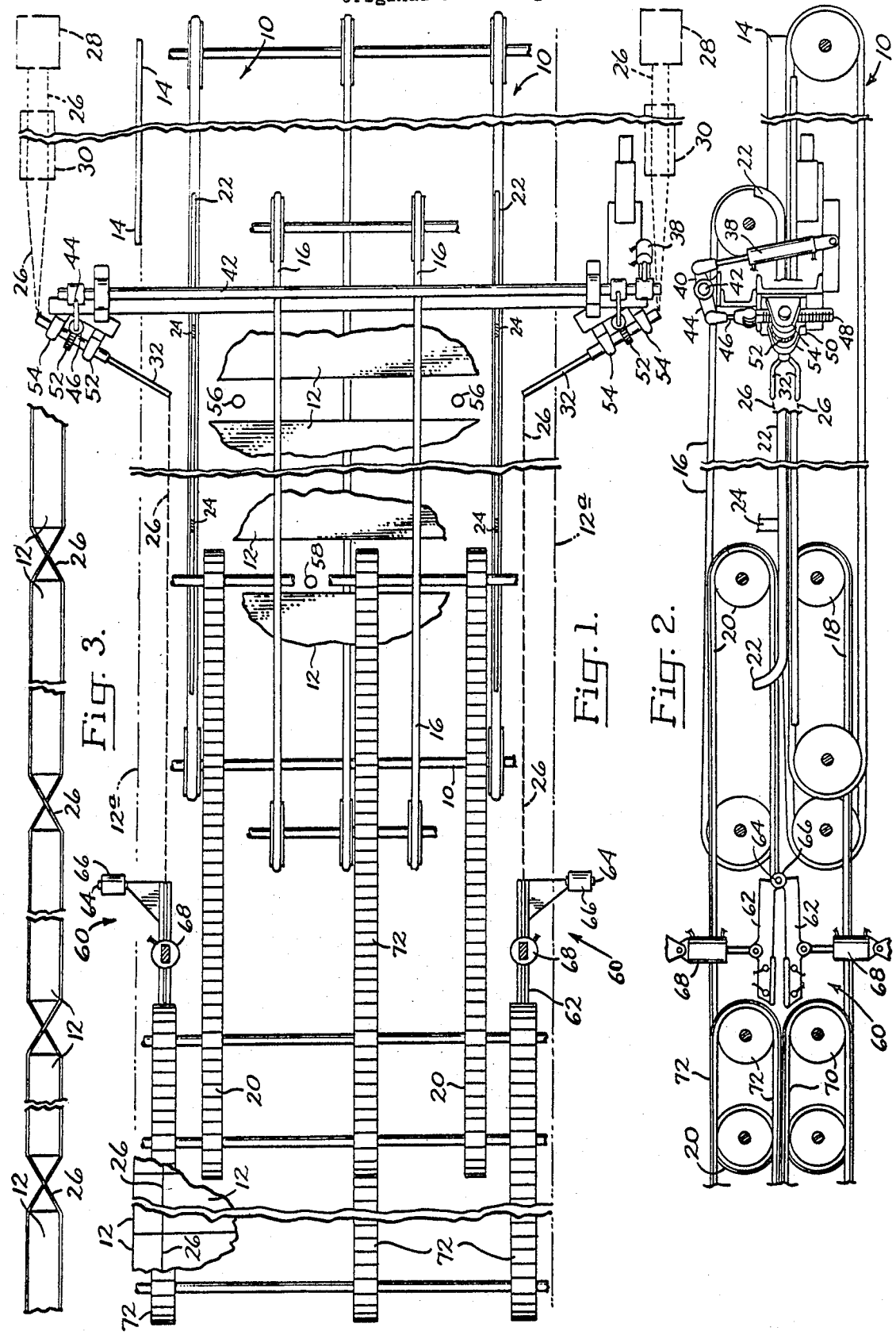

3,705,829
METHOD FOR FASTENING WOOD VENEER SHEETS TOGETHER EDGE TO EDGE
Roderick L. Brenneman, Corvallis, and Daniel M. McLean, Independence, Oreg., assignors to Georgia-Pacific Corporation, Portland, Oreg.
Original application Aug. 13, 1968, Ser. No. 752,285, now Patent No. 3,607,562. Divided and this application Oct. 12, 1970, Ser. No. 80,243
Int. Cl. B32b 21/10
U.S. Cl. 156—65    5 Claims

ABSTRACT OF THE DISCLOSURE

Substantially rectangular sheets are fastened together edge to edge by arranging the sheets in spaced relation, arranging a pair of continuous strings, one above and one below the sheets, traversing the strings and the spaced sheets relative to each other, crisscrossing the strings sequentially at each between-sheet space, crowding the sheets together edgewise, and fastening the criss-crossed strings to the sheets, thereby fastening the sheets together in a continuous strip.

---

This is a division of the patent application of Roderick L. Brenneman and Daniel M. McLean, Ser. No. 752,285, filed Aug. 13, 1968 for Method and Apparatus for Fastening Sheets Together Edge to Edge, now U.S. Pat. No. 3,607,562.

This invention relates to method and apparatus for fastening together substantially rectangular sheets in edge to edge relation. It pertains particularly to method and apparatus for fastening together random width plywood veneers in edge to edge relation to form a continuous strip of veneer composited from the individual sheets, which strip may be clipped into plywood sheet size and used to advantage in the manufacture of plywood panels.

In the conventional procedure for manufacturing plywood, full sized back veneers are conveyed to an assembly station at which glue-coated pieces of core veneer of random width are laid across them, edge to edge, in number sufficient to composite a core layer. A face veneer then is superimposed upon the partially completed assembly. This procedure is repeated until a final assembly of the desired number of laminate has been composited. The assembly then is transfered to the press and consolidated to set the glue and form the plywood panel.

Compositing the core layer in the manner described above has two principal disadvantages. First it is time-consuming and laborious, reducing the output of the plywood line and increasing the cost of the finished product.

Second, even though the small pieces of veneer from which the core layer is composited are clipped, edge irregularities occasionally are present. In addition, the workmen laying up the core work at high speed and occasionally do not abut the side edges of the veneer pieces with the precision required to form a continuous core layer. Either contingency results in the production of voids in the finished plywood panel. These in turn constitute an imperfection which degrades the product.

Various expedients heretofore have been employed to overcome this problem.

The core veneer pieces have been edge glued to form a full size core which then is handled as a unit. This method requires special, expensive apparatus, is essentially a piece work operation and adds materially to the cost of the product.

Also, the core veneer pieces have been composited into a full size core by laying them edge to edge and fastening them together on one side with adhesive-impregnated string. However, since the string is applied to one side only, flexing of the resulting panel pops off the string and disintegrates the panel.

It is the object of the present invention to provide method and apparatus for fastening together sheet material edge to edge, particularly wood veneers edge to edge, by a procedure which is rapid, economical, adaptable to inclusion in the conventional plywood line and which leads to the formation of a composite product, the component sheets of which are firmly secured together so that they may be handled safely and fabricated into full sized panels without disintegrating during the manufacturing processes employed.

The manner in which the foregoing and other objects of this invention are accomplished will be evident from a consideration of the accompanying specification and claims, in the light of the illustrative drawings, wherein:

FIG. 1 is a somewhat schematic plan view of apparatus for fastening together sheets in edge to edge relation by the method of the present invention;

FIG. 2 is a view in side elevation of the apparatus of FIG. 1; and

FIG. 3 is a schematic view of a series of the sheets in an intermediate stage of the method.

Generally stated, the herein described method of fastening together sheets in edge to edge relation comprises the following steps:

(1) Arranging substantially rectangular sheets side by side, spaced laterally from each other with their adjacent side edges substantially parallel;

(2) Arranging a pair of continuous strings, one above and one below the sheets substantially normal to the side edges of the sheets a spaced distance inwardly from the end edges thereof;

(3) Traversing the strings and the spaced sheets relative to each other.

(4) Criss-crossing the strings sequentially at each between-sheet space.

(5) Thereafter crowding the leading edge of each trailing sheet against the trailing edge of the adjacent leading sheet to form a continuous composite sheet; and (6) Securing the strings to the sheets to maintain them in their closely juxtaposed position.

Considering the foregoing in greater detail and with particular reference to the drawings:

As illustrated in FIGS. 1 and 2, the apparatus employed in executing the herein described method includes a traveling conveyor 10, the working stretch of which is driven to the left as viewed in the drawings. This conveyor may be long, e.g. 80 feet or more in length in a plywood installation. A layup station is located beside the conveyor. At this station small sheets of rectangular material such as plywood veneers 12 of random width, are placed side by side on the conveyor with their adjacent side edges substantially parallel and with the sheets spaced laterally from each other a predetermined minimum distance. A backstop 14 assists the operator in laying the sheets along a uniform line indicated at 12a in FIG. 1.

Cooperating with conveyor 10 are holddown belts 16. These hold down the sheet material, which may have a tendency to bow. The downstream ends of the two conveyors converge slightly, as is apparent in FIG. 2. This assists in delivering the veneers to the crowding conveyors which work immediately downstream.

The latter conveyors comprise lower endless chain assemblies 18 and cooperating upper endless chain assemblies 20. The chains employed are conventional in character and belong to the class comprising flat links which bear firmly against the faces of the sheets, holding them securely and preventing them from slipping.

Motor means, not illustrated, are provided for driving conveyor pairs 10, 16 continuously at a predetermined rate, and crowder chain pairs 18, 20 intermittently at the desired rate. Holddown shoes 22 supported on frame member 24, assist in holding down the veneers and maintaining them properly spaced at the critical interval of transfer from conveyor pairs 10, 16 to crowder chains 18, 20.

It is during this interval of transfer that the strings, tapes, or other flexible members employed for fastening the sheets together are applied.

Such strings are indicated at 26. They are laid continuously on both faces of the sheets substantially normal to the side edges thereof and at a spaced distance inwardly from the end edges thereof. The mechanism by which the strings are applied also is illustrated in FIGS. 1 and 2.

The strings are supplied from a tensioning reel indicated schematically at 28. They pass in pairs through an impregnating vat 30 containing a heat-alterable glue, i.e. one which may be caused to harden or soften by the application of heat. If the former, as in the case of a thermosetting resinous adhesive, the glue is applied in liquid form and subsequently set by the application of heat. If the latter, as in the case of a thermoplastic adhesive, the glue is applied and spread while hot and molten, after which it hardens upon cooling.

In either case, the liquid glue is contained in vats 30. It is absorbed into strings 26 as the latter pass through the vats. The glue-impregnated strings then are transferred to the apparatus which weaves them around sheets 12.

A key element of the weaving apparatus comprises a unique, bifurcated string guide 32 comprising a pair of hollow arms communicating with a hollow stem, all dimensioned to receive and guide the strings which pass together through the stem, separate, and come separately one out of each of the arms.

String guide 32 is maintained in an angular position in which its arms overlie the margin of the line of sheets 12a, projecting inwardly a predetermined distance. The angular position of the guide is correlated with the spacing between the sheets so that as the sheets pass between the arms, the arms are free to rotate 180° in the space between the sheets.

Such rotation is accomplished by a suitable drive. That illustrated in the drawings comprises a fluid-operated cylinder, preferably a double acting pneumatic cylinder 38. The piston rod of the cylinder is coupled pivotally to a lever 40. The latter is fixed to a rock shaft 42 to which also is affixed one or a pair of levers 44. The latter are diametrically opposed to lever 40.

Levers 44 pivotally are coupled to a connecting shaft 46, one end of which pivotally is coupled to a vertically arranged rack 48. Rack 48 works in a guideway 50.

A cooperating pinion gear 52 is keyed to the stem of string guide 32. The stem is journaled in bearings 54.

Suitable control means energize cylinder 38 when string guides 32 are positioned in the spaces between adjacent ones of the sheets.

Such means comprise a pair of photoelectric cells 56 which are in an electric circuit with a solenoid valve controlling the operation of double acting cylinder 38. The photoelectric cells preferably are arranged in alignment with string guides 32. There are two such cells in series with each other to insure that the apparatus does not work in the event that one or the other of the adjacent sheets is askew, or improperly spaced.

When string guides 32 are located in a gap between adjacent sheets, the circuit through the photoelectric cells is completed, double acting cylinder 38 is energized and the string guides rotate through 180°. This crisscrosses the strings in the manner illustrated in FIG. 3 so that the strings are woven about the sheets and hold them together.

Cooperating with the string-applying apparatus is apparatus for crowding the adjacent edges of the sheets together so that they lie in closely edge-abutting relation. This is desired, for example, in the compositing of a unitized core veneer.

The crowding apparatus comprises conveyor belts 10, 16 and flat crowder chains 18, 20, above described, coupled with a suitable drive control.

A photoelectric cell 58 again is a key component of this control. The cell is located in the line between shafts 18, 20 in the plane of the axes thereof. It is in an electric circuit with the drive for the chains and is operative to start and stop them.

Thus when the light beam of the cells is intercepted by one of the sheets 12, the drive of the chain is energized. This conveys the sheet in the outfeed direction. However, as soon as the sheet clears the cells, the chain drive stops.

In the meantime, the drive of conveyor belts 10, 16 continues. This moves next adjacent sheet 12 in the direction of the sheet immediately ahead. As soon as the gap between the sheets has closed, the light beam is interrupted and the chain drive again energized. This sequence is repeated over and over with the result that all of sheets 12 are crowded closely together in the desired position.

During the crowding operation, strings 26 remain under the tension applied by the tensioning device 28. Accordingly, any slack resulting from the crowding is taken up, since the adhesive on the strings has not yet set.

The next step in the sequence is to set the adhesive and fix the sheets in their edge to edge position.

If a thermo-alterable adhesive has been employed to impregnate the strings, it is set or spread by the application of heat through the agency of cooperating pairs of heated presses, indicated generally at 60. Each comprises an electrically heated, elongated pressing element 62 arranged in the feed direction and pivoted on a short shaft 64 journaled in a bearing 66. Each also is actuated by means of a double acting, fluid operated cylinder, preferably an air cylinder 68. The case of cylinder 68 is pivoted to a frame member; its piston rod, to heating element 62 intermediate its ends.

Precautions are taken to insure that during the intermittent operation of crowder chains 18, 20, heating elements 62 are removed from contact with the strings whenever the chains stop. This prevents overheating and burning of the strings.

To this end cylinders 68 are controlled by the action of an electrically operated pneumatic valve, the setting of which is controlled by electric eye 58. These two elements are in an electric circuit with each other and arranged in such a manner that when electric eye 58 closes the circuit, energizing the drive of crowder chains 18, 20, it closes at the same time a circuit to the solenoid valve which adjusts cylinders 68 to the closed positions of heating elements 62. However, when the beam of electric eye 58 is interrupted, the reverse situation occurs and the cylinders withdraw the heating elements when forward drive of the crowding chains is arrested.

Downstream from heating units 60 are pressing means for pressing the heated strings into the sheets upon which they have been laid. Such means comprise cooperating endless chains 70, 72. Pressing chains 70, 72 include flat links which contact the sheets positively. As a consequence they flatten the strings, insure that the strings contact the sheet surfaces uniformly, and further assist in the setting of the adhesive with which the heated strings are impregnated.

OPERATION

To review the operation of the herein described apparatus:

Plywood core veneers or other sheets are placed on infeed conveyor 10, side by side, spaced laterally from each other, and with their adjacent side edges substantially parallel.

The sheets are conveyed to the left as viewed in FIGS. 1 and 2 are held down both by upper cooperating conveyor belt 16 and hold down shoes 22. As the sheets pass in sequence over electric eyes 56, the eyes energize cylinder 38 at each gap between the sheets. Through the acation of rack 48, the cylinder rotates string guide 32 through 180° crisscrossing the two glue-impregnated strings passing through the guide in the manner illustrated in FIG. 3.

As the sheets pass electric eye 58, the eye energizes the drive of crowder chains 18, 20, moving the sheet toward the outfeed end of the apparatus. However, as soon as the sheet clears electric eye 58, the drive is stopped.

Conveyor chains 10, 16, which operate continuously, advance the next succeeding sheet until its leading edge is in tight abutment against the trailing edge of the stationary sheet held between the crowder chains. In this position of the two sheets, the beam of electric eye 58 again is intercepted, initiating the drive of the crowder chains.

As the unitized sheet assembly progresses further, it passes beneath heating elements 60 which are forced against the strings superimposed upon the sheets by the action of cylinder 68. This presses the strings against the sheet surfaces and spreads or sets the adhesive.

Cylinders 68 are controlled by a solenoid-operated valve which also is in a circuit with electric eye 58. It separates heating elements 62 whenever the drive of crowder chains 18, 20 stops. This prevents burning the strings.

The pressing and adhesive setting operation initiated by elements 62 is continued by pressing chains 70, 72 to which the composite sheet next is transferred.

The foregoing sequence results in the production of a continuous sheet of indefinite length. The sheet is made up of small pieces of random width held together securely, even though the sheet is flexed and distorted during subsequent processing operations.

If the sheet comprises a core veneer to be used in the fabrication of plywood, it may be clipped to plywood panel length and the resulting full sized sheets used in laying up the assemblies to be pressed into plywood.

This eliminates the necessity of laying up a multiplicity of small veneer pieces during the operation of the plywood line, eliminates to a large extent the production of plywood panels having void defects, and makes practical the automation of the plywood layup line.

Having thus described our invention in preferred embodiment, we claim as new and desire to protect by Letters Patent:

1. The method of fastening together substantially rectangular wood veneer sheets in edge to edge relation which comprises
   (a) arranging the sheets side by side, spaced laterally from each other, with their adjacent side edges substantially parallel,
   (b) arranging a pair of continuous strings, one above and one below the sheets substantially normal to the side edges of the sheets, a spaced distance inwardly from the end edges thereof,
   (c) traversing the strings and the spaced sheets relative to each other,
   (d) criss-crossing the strings at each between-sheet space,
   (e) thereafter crowding together the adjacent side edges of the sheets, and
   (f) bonding the strings to the sheets to maintain them in their juxtaposed position, thereby forming a continuous composite strip.

2. The method of claim 1 wherein the strings are bonded to the sheets by gluing them thereto.

3. The method of claim 1 including the step of applying tension to the strings during the crowding step, thereby eliminating any slack in the strings resulting from the crowding together of the sheets.

4. The method of claim 1 including the step of impregnating the strings with thermosetting adhesive, and after crowding the sheets together applying heat and pressure to the strings to flatten them against the sheets and set the adhesive.

5. The method of claim 1 including the step of clipping the continuous composite product into plywood sized panels.

References Cited
UNITED STATES PATENTS

| | | | |
|---|---|---|---|
| 3,377,223 | 4/1968 | Clausen et al. | 156—433 |
| 3,445,313 | 5/1969 | Clausen et al. | 156—433 |
| 3,490,974 | 1/1970 | Jacobson | 156—304 |
| 3,579,405 | 5/1971 | Crawford | 156—304 |

DANIEL J. FRITSCH, Primary Examiner

U.S. Cl. X.R.

156—148, 166, 178, 304, 433